United States Patent [19]
Saracini

[11] Patent Number: 5,178,368
[45] Date of Patent: Jan. 12, 1993

[54] APPARATUS FOR STRINGING HIGH TENSION POWER LINES ON A SET OF TOWERS

[76] Inventor: Alessandro Saracini, Via della Camilluccia 647, Roma, I-00135, Italy

[21] Appl. No.: 572,974

[22] PCT Filed: Sep. 23, 1988

[86] PCT No.: PCT/EP88/00860
§ 371 Date: Jul. 31, 1990
§ 102(e) Date: Jul. 31, 1990

[87] PCT Pub. No.: WO89/07356
PCT Pub. Date: Aug. 10, 1989

[30] Foreign Application Priority Data

Feb. 1, 1988 [IT] Italy ................. 47586 A/88
Feb. 1, 1988 [IT] Italy ................. 47587 A/88
Feb. 1, 1988 [IT] Italy ................. 47588 A/88

[51] Int. Cl.⁵ ............................. B65H 59/00
[52] U.S. Cl. ............................. 254/134.3 PA
[58] Field of Search ............... 254/134.3 PA, 134.3 R, 254/134.3 FT

[56] References Cited

U.S. PATENT DOCUMENTS

| | | | |
|---|---|---|---|
| 2,155,053 | 4/1939 | Kuenzi | 254/134.3 PA |
| 4,018,422 | 4/1977 | Bozeman | 254/134.3 PA |
| 4,596,379 | 6/1986 | Saracini | 254/134.3 PA |

Primary Examiner—Robert C. Watson
Attorney, Agent, or Firm—Young & Thompson

[57] ABSTRACT

A method for stringing high tension power lines on a set of towers, comprising the steps of: mounting a first pulley generally on the top of each tower; mounting at least a second set of pulleys suspended form the insulators beneath the first pulley on each tower; mounting rolling guide means above each crossarm of each tower; mounting second guide means connecting the tip of each crossarm to each one of said second set of pulleys; disposing a first cable on each of the first pulleys; attaching said first cable to a first spreader connecting member carrying at least second and third cables; drawing said first cable past said first pulleys; and drawing the first spreader connecting member over the first pulleys while concurrently guiding at least one of said second and third cables generally downwardly along the rolling surface of said rolling guide means onto the sliding surface way of said second guide means and into the central groove of one of said second set of pulleys. Apparatus to carry out said method.

28 Claims, 20 Drawing Sheets

APPARATUS FOR STRINGING HIGH TENSION POWER LINES ON A SET OF TOWERS

DESCRIPTION

As it is well known to all experts in the art of power line construction, stringing single and/or bundles of conductors, on suspension and/or strain or dead-end towers, requires: 1) the use of large quantities of pilot and/or service cords and/or draw cables in the initial stage of the stringing procedure and 2) the use of a brake (or tensioner) and a winch (or puller). The winch being mostly used to recover said pilot and/or service and/or draw cables and substitute them with conductors, and the brake being mostly used to tension said conductors and keep them always raised from the ground.

The brake and the winch are usually positioned 4 to 6 miles from each other with several towers between them. All stringing operations usually start from the brake and move toward the winch.

Pilot cords are light cables, usually of synthetic material such as nylon, normally used in conjunction with helicopter stringing, whereas service cords and draw cables are relatively heavy steel cables capable of withstanding considerable tension and torques, and normally used to pull conductors or bundles of conductors.

If the stringing is carried out with the most traditional manual method, said service cords have to be first laid out on the ground, then raised and conveyed over the pulleys suspended from the towers, tensioned by means of a brake and a winch, and finally replaced with larger draw cable (particularly when dealing with more than one conductor per phase) before the conductors can be pulled. In other words the traditional method of stringing power lines usually comprises the following operations:

1. laying out—on the ground—one service cord per each electrical phase and one per each earth-peak:
2. raising and conveying each service cord over the pulleys suspended from each tower between the brake and the winch:
3. tensioning all service cords by means of a brake and a winch:
4. recovering each service cable from one end while the other end is coupled with a larger draw cable;
5. recovering said draw cables from one end while the other end is coupled with conductors;
6. and finally, plumbing the insulators and clamping the conductors.

The just described stringing method encounters considerable difficulties which may readily be understood and are well known to those skilled in the art. The problems relate to the initial laying out of said service cords on the ground, the consequent need for cutting all the plants along the entire power line and the handling of large quantities of service cords and draw cables.

These difficulties are correspondently greater when the conductors have to cross mountainous regions, crops, rivers, swamps, highways, other power lines, and build-up areas.

In an attempt to alleviate these difficulties and the associated long periods of work, it has been proposed to use helicopters to position pilot cords directly on the towers. A helicopter moves along the route of the line above the towers and gradually unwinds one pilot cord at a time. These pilot cords are then either conveyed over the suspended pulleys by operators or automatically run on specially-shaped pulleys.

After the pilot cords have been positioned, they have to be replaced with larger service cords and/or draw cables before the conductors can be pulled.

The method of stringing power lines with the help of helicopters has the great advantage of reducing damage to the vegetation, and shortening work time, but is not free from disadvantages.

In fact, the helicopter pilots have to be particularly skillful: first of all, because the helicopter motion is opposed by the pilot cord, which is at least partly under tension; secondly, because the pilot cord must be positioned on the towers with high accuracy; thirdly, due to the need for accuracy, the helicopter has to fly at very low altitudes over the towers; and last but not least, since the most important power lines normally have six phases and at least one earth-peak, the difficulties and risks have to be multiplied by a factor of seven. In fact, the helicopter in order to accompany the pilot cords nearly as far as the lowest crossarms, has to descend to an altitude at which the rotor blades may be dangerously near the tip of the tower or actually below it. Moreover, the pilot cords, which are only partly under tension, may get caught in the trees, brake, and therefore cause a loss of both time and material, or even worse tend to pull the helicopter down.

For these reasons the aforementioned method is usually restricted to the most important power lines, and/or to particularly difficult routes.

The present invention is mostly concerned with the mentioned problems and difficulties of positioning pilot and or service cords, draw cables, and conductors.

The previously mentioned stringing methods had been substantially improved with the system described in patent # EP-B1-0056285 (or U.S. Pat. No. 4,596,379). According to this patented system, after a single pilot or service cord had been positioned on a set of pulleys on the highest point of each tower, using either one of the traditional methods, said pilot or service cord was going to be replaced with a first draw cable or shield-wire, while at the same time at least one supplementary draw cable was going to fall on a second set of pulleys below. Once said supplementary draw cable had reached said second set of pulleys below, it was used to pull a conductor (or bundle of conductors) and an additional draw cable by means of a balanced-device, and while said conductor or bundle of conductors would have stayed on said second set of pulleys, said additional draw cable would have fallen on a third set of pulleys further below. These operations were repeated till a last draw cable would have been positioned on the lowest level pulleys for stringing the last electrical phase of the power line.

With this system, in the case of a double circuit transmission line for example, it was no longer necessary to lay on the ground seven pilot or service cords or to make seven helicopter trips, but it was enough to position only one pilot or service cord with traditional methods. The system seemed to greatly reduce and simplify the preparatory work necessary for stringing conductors. The conventional methods had to be used only for positioning a single pilot or service cord, more particularly the cable for pulling the shield-wire, whereas all the other draw cables were automatically positioned during the progress of the work of stringing the line. The use of helicopters was also limited to the positioning of a single cable and consequently had become quite economic and justifiable even on lines of secondary importance in order to reduce damage to vegetation at all times.

However, this very promising patented system developed problems particularly with regard to the preferred embodiments and the difficulty of perfectly controlling the supplementary draw cables as they were pulled from tower to tower, guided downwards, and positioned on the set of pulleys at lower levels.

More specifically, as it was described in patent # EP-B1-0056285 (or U.S. Pat. No. 4,596,379) when the supplementary draw cables were rerouted downwards, under the action of their own weight and the pulling tension, said cables tended to fail without secure control. As a matter of fact, particularly if stringing through strain or angle towers, the transversal force acting on the cables might have caused the cables to fall on the ground rather than on the swivel-guide attached to each pulley below.

In addition, the swivel-guide was very heavy both because of its projecting and therefore rigid structure and the presence of special joints that allowed it to rotate into a "rest" position. The weight of said swivel-guide and its motion from "work" to "rest" positions caused the pulley unit to swing dangerously. In addition, said swivel-guide would often be damaged by the abrupt fall of the supplementary draw cables, fail to undertake its "rest" position, and consequently make the automatic positioning of the next supplementary draw cable impossible.

An other difficulty was generated by the fact that the supplementary draw cables were attached to the balanced-device in a lateral and eccentric position as compared to the pulling axis. This caused the balanced-device to rotate, twist the cables and/or conductors, and jam while passing on the pulley grooves.

The purpose of the present invention is to stream-line the just mentioned stringing systems according to a new set of equipment which has been designed to avoid the just mentioned inconveniences and yet maintain all the above described advantages. In fact, the new procedure and equipment allow a more progressive, gentle and controlled movement of all supplementary draw cables both as they are pulled and guided downwards and also as they fall on the set of pulleys at lower levels.

Due to the fact that the present invention is an improvement of the invention described in the mentioned patent # EO-B1-0056285 (or U.S. Pat. No. 4,596,379), the patent text # EO-B1-0056285 (or U.S. Pat. No. 4,496,379) might be recalled in order to clarify parts of the present invention.

The additional advantages and improvements of the present invention have been achieved thanks to the characteristics underlined in the method claims 1 to 4, and the apparatus claims 5 to 39.

Other characteristics and advantages of the system according to the present invention will become more readily understandable with the following description of some preferred procedures, given only as a way of example and illustrated in the enclosed drawings, where:

FIGS. 14C to 14F are schematic views of a spreader-deviator device used to pull a bundle of conductors and a supplementary draw cable on different horizontal planes by means of a single draw cable;

Figure 17:
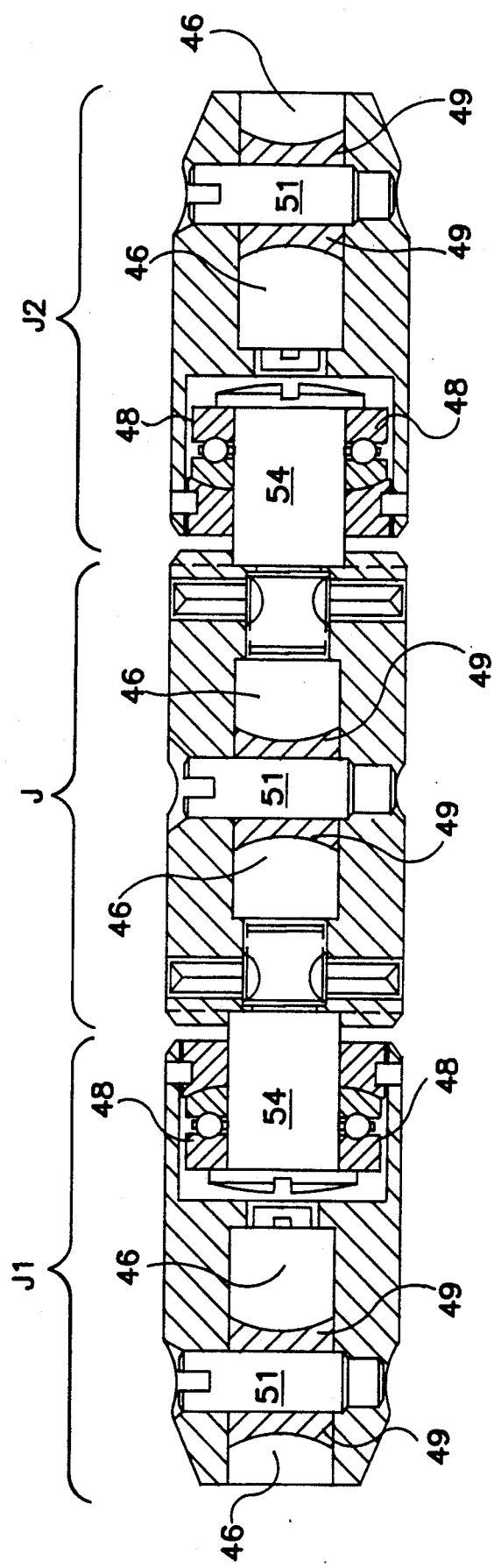

SECTION 16C shows details of how the reeving-wheel is connected to the crossarm;

FIG. 17 shows a rotating-three-way-joint for connecting a draw cable to an other cable or conductor and a length of service cord.

DESCRIPTION OF THE PREFERRED EMBODIMENTS

Figure 1:
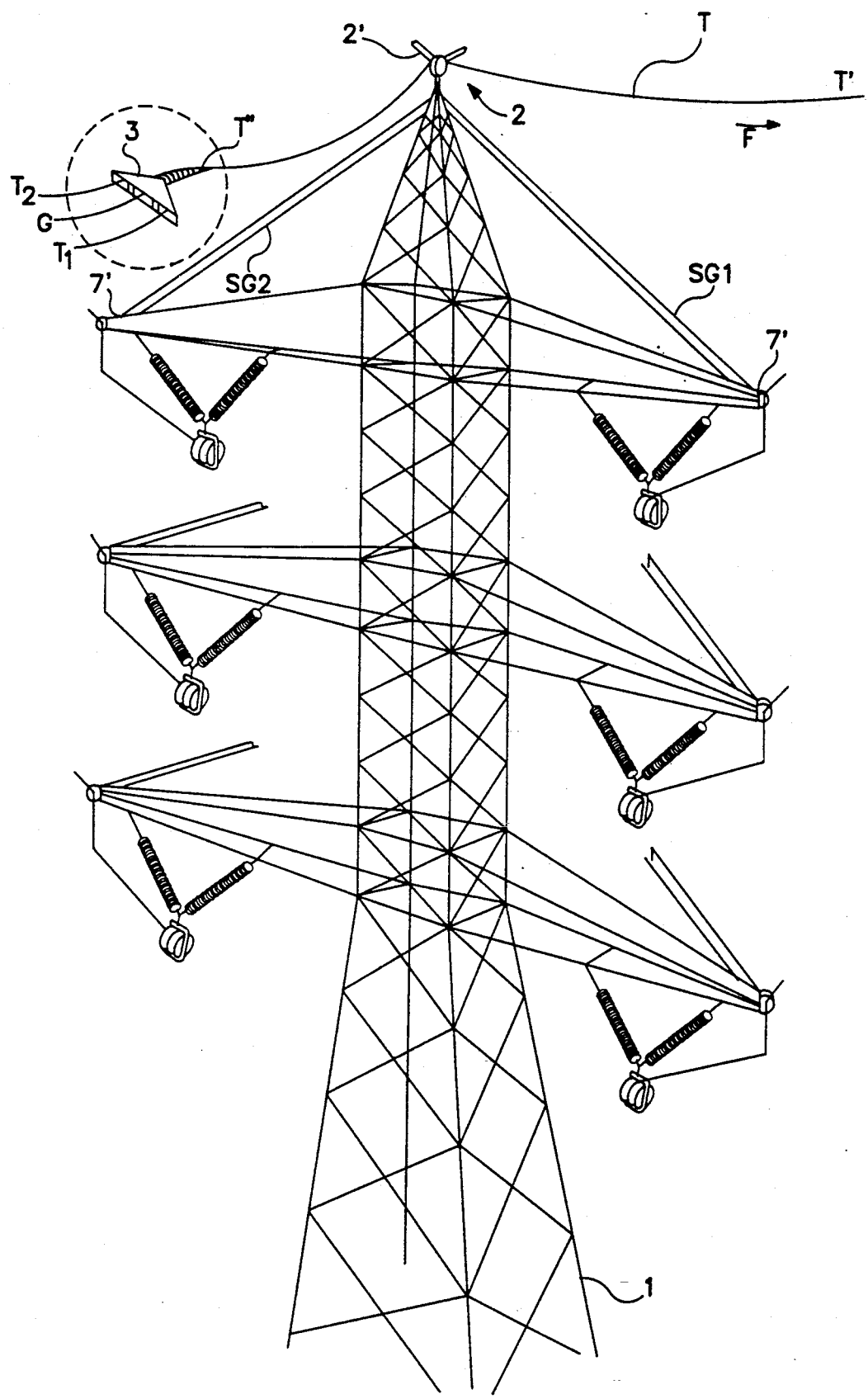
FIGS. 1 to 7 show a double-circuit tower fitted with special equipment during seven subsequent stringing stages.

As shown in FIG. 1, a pulley (2) (fitted with "horns" (2')) is mounted at the top of each tower (1) for the positioning of one pilot cord (not shown) by helicopter, or one service cord (not shown) with traditional manual method, on a set of subsequent towers.

As mentioned earlier, since the helicopter can now be used for a single trip rather than seven, the single pilot cord is preferably laid by helicopter even on secondary lines in order to keep damage to the vegetation at a minimum. In addition, since said pilot cord is positioned on the highest point of each tower all the risks mentioned earlier are also reduced to a minimum. According to the present invention, however, the first service cord could also be positioned with the conventional manual method on any series of suspended pulleys. In this case all the advantages will likewise be obtained except for the speed of stringing that first service cord.

Once the pilot or service cord has been positioned it will be replaced with a larger draw cable (T). As it is well known by the experts in power line construction, the pilot or service cord is pulled from one end by the winch, while the other end is coupled to the draw cable (T) which in its turn is kept under constant tension by the brake. This may be regarded as the end of the preparatory stage before the shield-wire, supplementary draw cables, and conductors (or bundle of conductors) are strung. The just mentioned preparatory stage could also be further simplified, at least in certain cases, by the initial direct manual stringing of a first draw cable (T) rather than a first service cord.

FIG. 1 shows the first draw cable (T) being pulled from end (T'), as indicated by the arrow (F) toward the winch (not shown), whereas the other end (T") is secured to a "spreader" (3). Said "spreader" (3) is approaching pulley (2), and is connected to a shield-wire (G) and two supplementary draw cables (T1) and (T2).

Figure 14A:
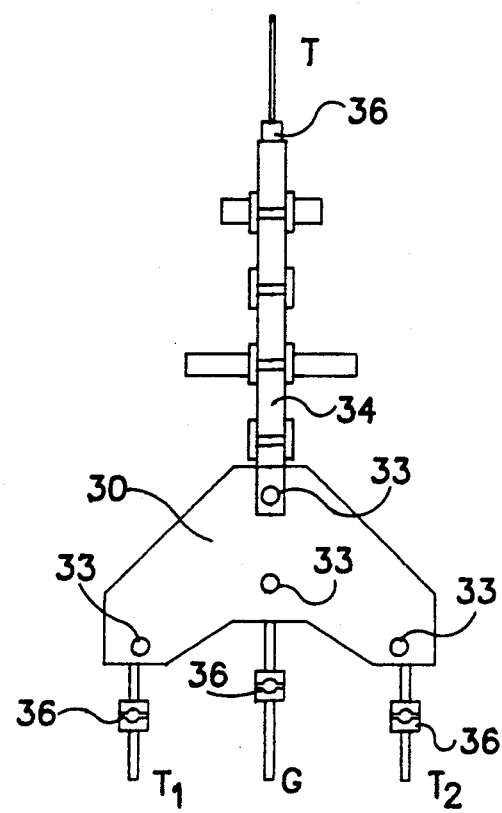
FIG. 14A and 14B show two different views of a spreader device fitted with an "arrow" shaped plate used to pull one cable or a bundle of cables by means of a single draw cable.
Figure 14B:
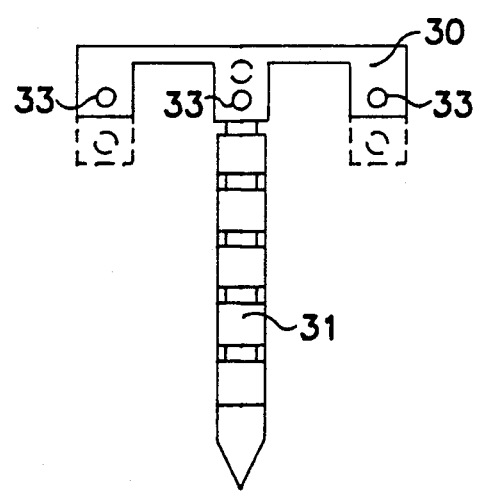
Figure 14C:
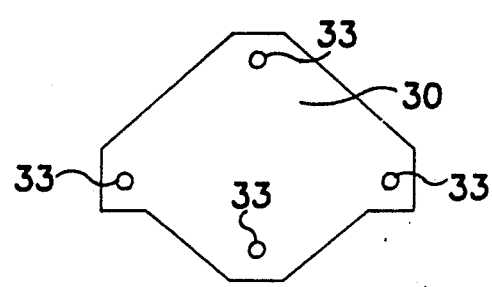
FIG. 14C shows a "diamond" shaped plate with which the spreader could be fitted instead of the "arrow" shaped plate depending on the different stringing conditions and requirements.

FIGS. 14A and 14B show some details of the "spreader" ((3) FIG. 1). The "spreader" is fitted with a tridimensional plate (30), a counter-weight chain (31), one rotating joint (36) and one ball-joint (33) per each cable attached to plate (30), and chain (34). During the recovery of the first draw cable ((T) FIG. 1), rotating joints (36), which absorb the "natural" twists of cables ((T), (G), (T1), and (T2) FIG. 1), counter-weight chain (31) and the special tridimensional shape of plate (30) hold plate (30) perfectly steady on the vertical plane. The right degree of horizontal stability, on the other hand, is achieved by positioning the attachment points of all cables, and consequently ball-joints (33), at a suitable distance from one another. Said suitable distance being determined by the pulling action of the cables as a function of the stringing requirements. Plate (30) could therefore have different top views. As a way of example and not in limitative manner, two different top views have been illustrated in FIG. 14A where plate (30) has an "arrow" shape, and FIG. 14C where plate (30) has a "diamond" shape. Ball-joints (33) allow to easily pull the cables through vertical and/or horizontal angles, that is to say through angle and/or summit towers. In addition, by reducing contact points to a minimum, the special tridimensional shape of plate (30) and chain (34) virtually eliminate friction and facilitate the passage of the whole "spreader" device over the pulleys or pulley units. It is to be understood that the described spreader device could be used for pulling any number of cables and/or conductors by adding the appropriate number of attachment points, that is to say the appropriate number of ball-joints (33) and rotating-joints (36).

Figure 2:
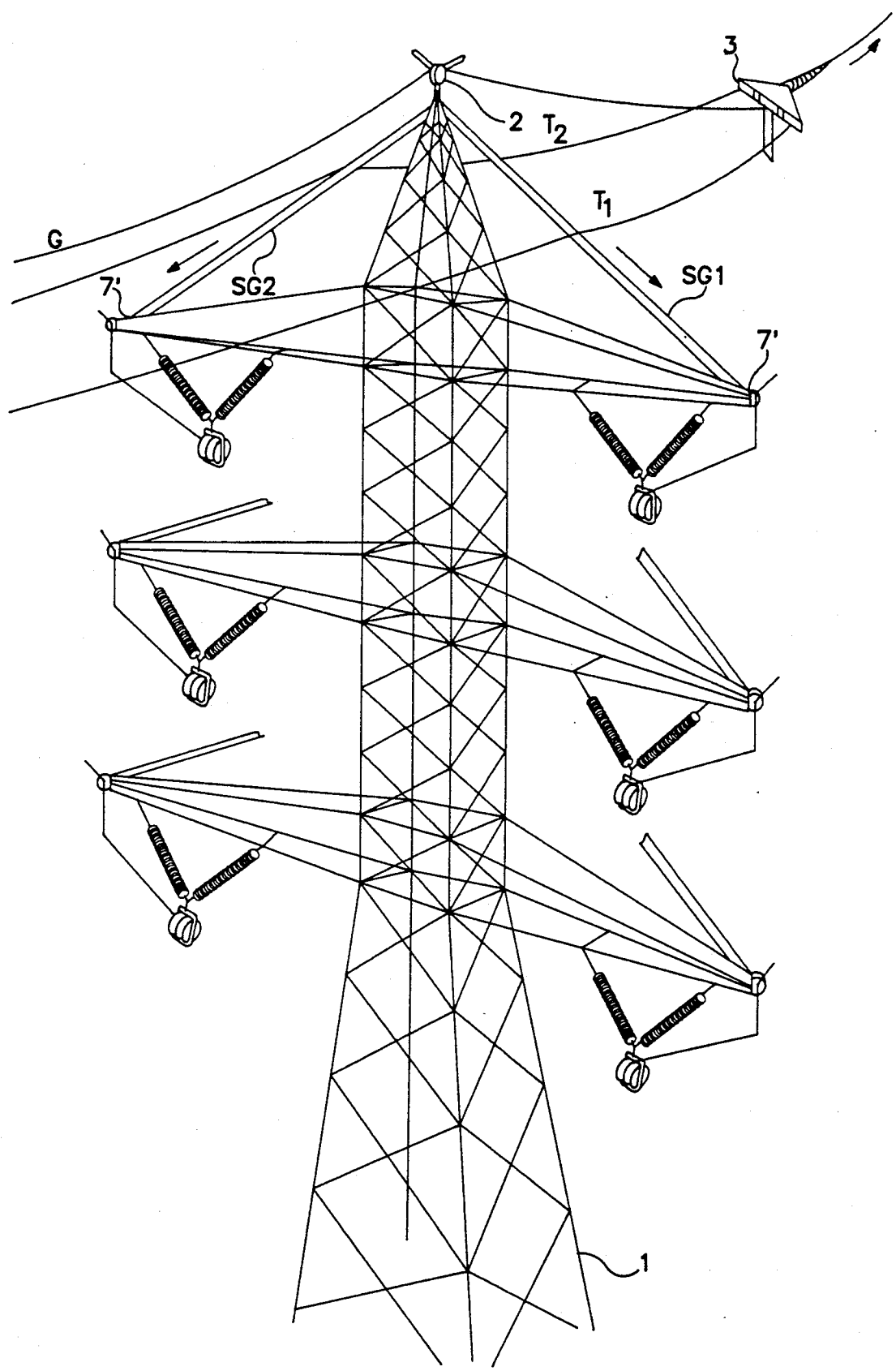

FIG. 2 shows how, once the "spreader" (3) has passed over pulley (2) and horns (2'), the shield-wire (G) is directly and safely laid in the groove of said pulley (2), whereas cables (T1) and (T2) have been deviated, rerouted outside the groove of pulley (2), and started sliding sideways over the special slide-guides (SG1) and (SG2). These slide-guides are secured to the sides of the frame of pulley (2), have a round cross-section, and are fitted with bearings so that they will rotate facilitating the cables downward motion.

The downward motion of cables (T1) and (T2) is not instantaneous, even if guides (SG) are fairly steep and rotating, but progressive and proportional to the distance of device (3) from tower (1). The reason being that as long as device (3) is near the tower, the weight of the draw cables, which is the primary cause of their downward motion, is offset by the pull of said cables towards device (3), i.e. towards the central axis of the line.

Figure 3:
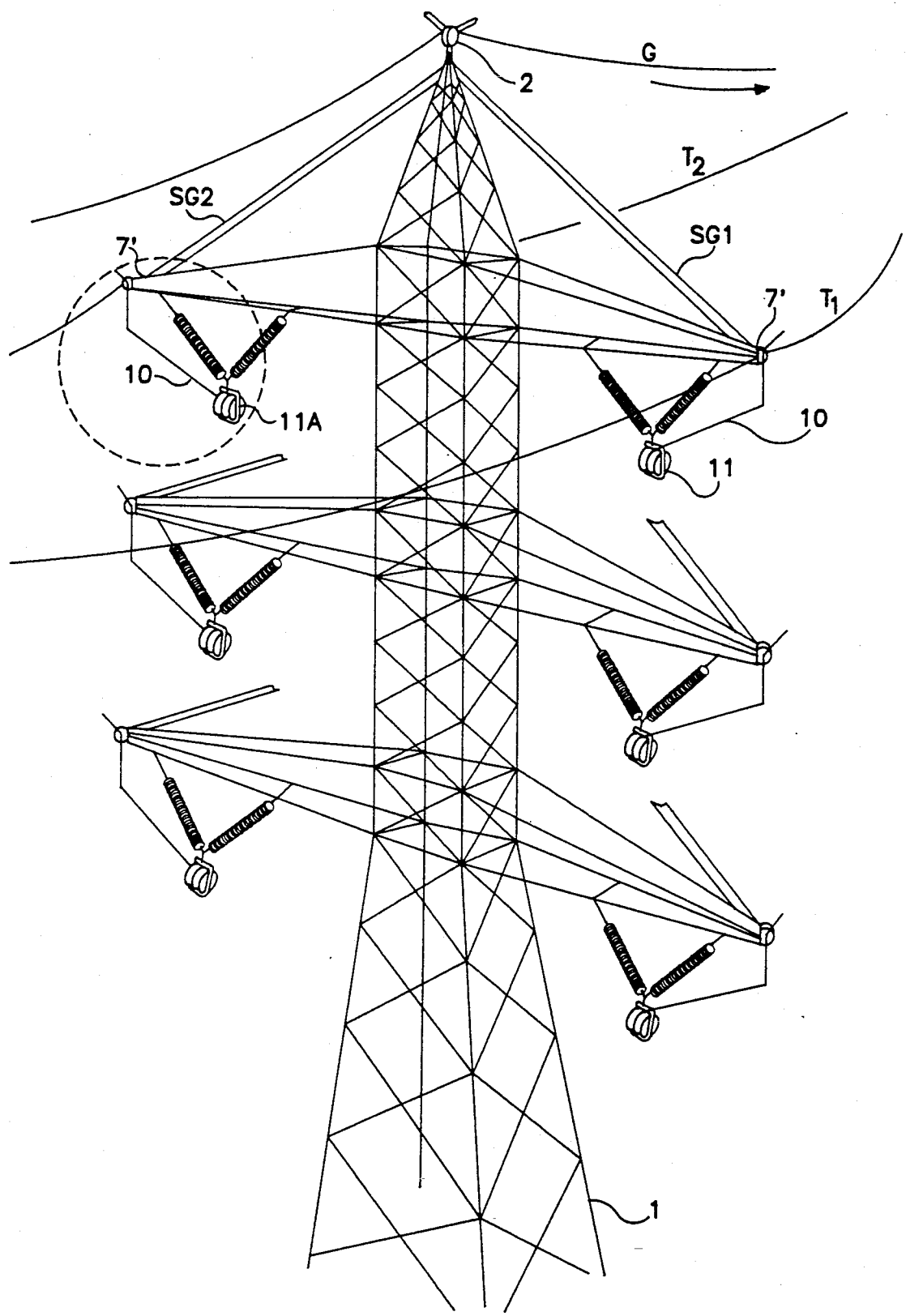

So as device (3) moves away from tower (1), cables (T1) and (T2) progressively move downwards till they reach the end (7') of guides (SG1) and (SG2) (see FIG. 3). At this point cables (T1) and (T2) will pass over the tip of the crossarms to be guided down, by means of "broom"-guides (10), towards pulleys (11) and (11a) below.

The details according to the invention of the special broom-guide device (10) are illustrated in FIGS. 15A through 16B, and Section 16C.

Figure 15A:
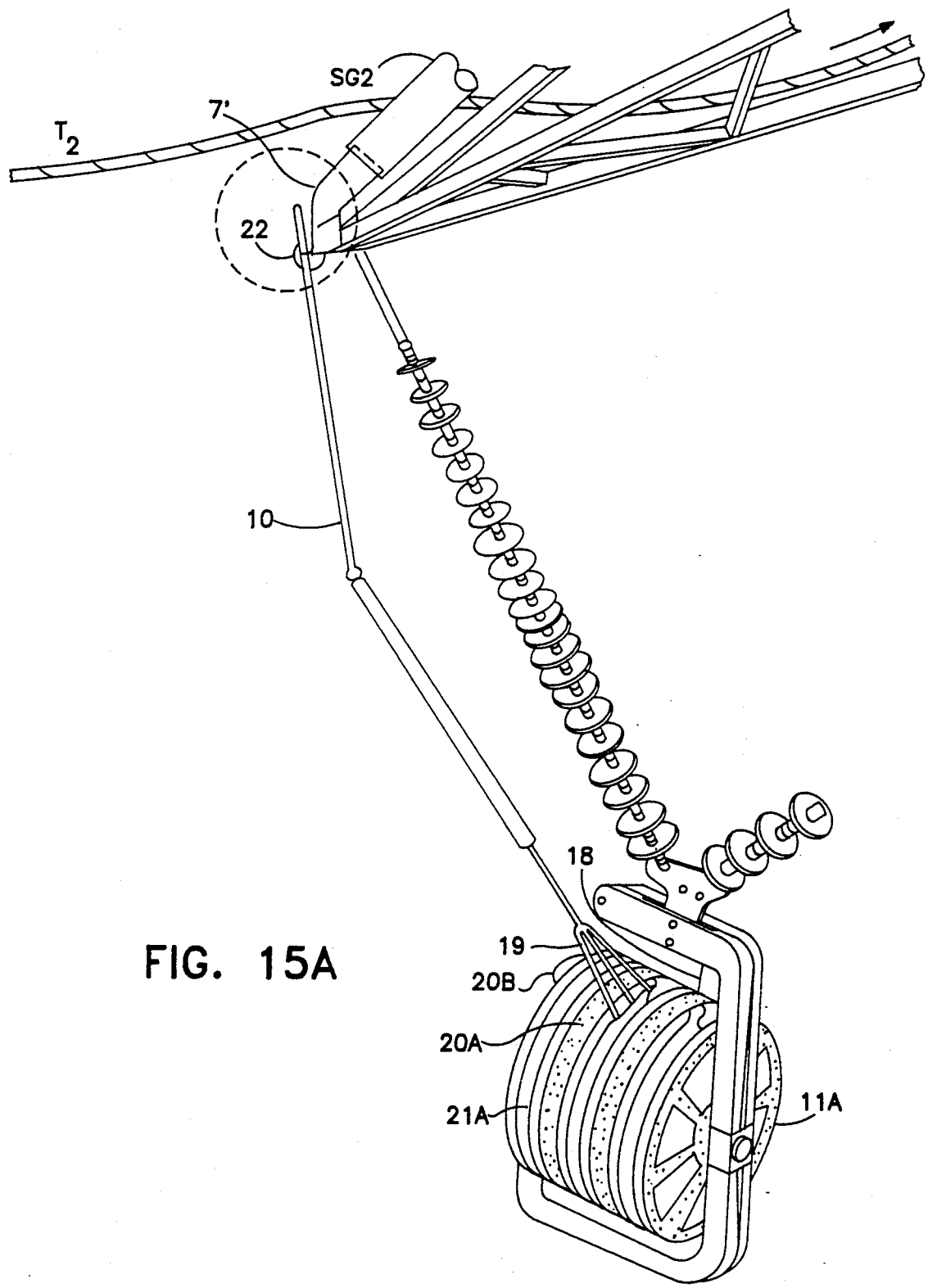
FIG. 15A to 15C show prospect views, in three different operating positions, of the "broom-guide" that guides the supplementary draw cables from the tip of the crossarm to the pulley suspended below.

FIG. 15A is a "close-up" of the upper-left crossarm of the tower illustrated in FIG. 3, during the same operating stage. In other words, FIG. 15A shows draw cable (T2) having reached end (7') of slide-guide (SG2), a reeving-wheel (22) connecting end (7') of slide-guide (SG2) to the special rod (10), and a special "broom" shaped attachment (19) connecting rod (10) to the special pulley unit (11a). Arc (20a), which has the same curvature as pulley wheel (21a), and device (20b) allow the whole guide device to remain securely hooked to pulley wheel (21a) till the draw cable (in this case T2) has securely fallen into the groove of said pulley wheel.

Figure 16A:
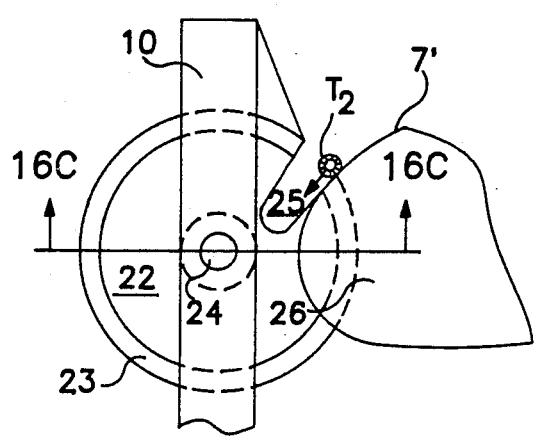
FIGS. 16A to 16B show two operating positions of the reeving-wheel that connects the crossarm to the "broom-guide"
Figure 16B:
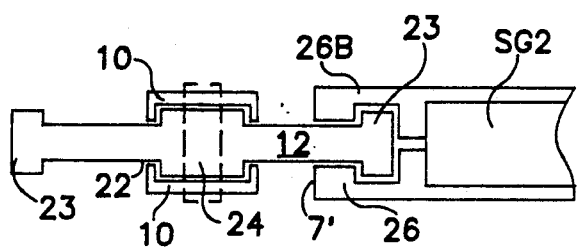
Figure 16C:
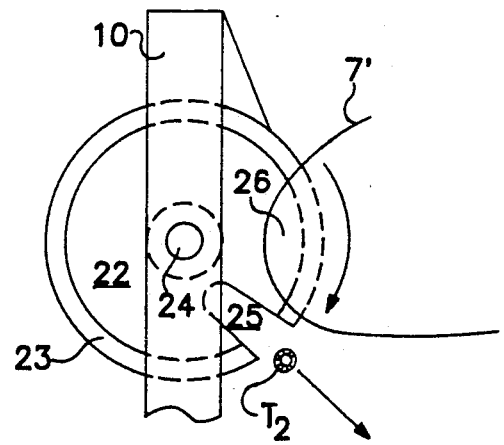

FIG. 16A, 16B, and section 16C show how the upper end of rod (10) is connected to reeving-wheel (22) through pin (24), how reeving-wheel (22) is connected to end (7') of guide (SG2) through special guides (26b), (26) and rim (23), and how once cable (T2) has fallen into slot (25), reeving-wheel (22) rotates, due to the weight of the cable, allowing the cable (T2) to pass from above to below end (7') of guide (SG2).

Figure 15B:
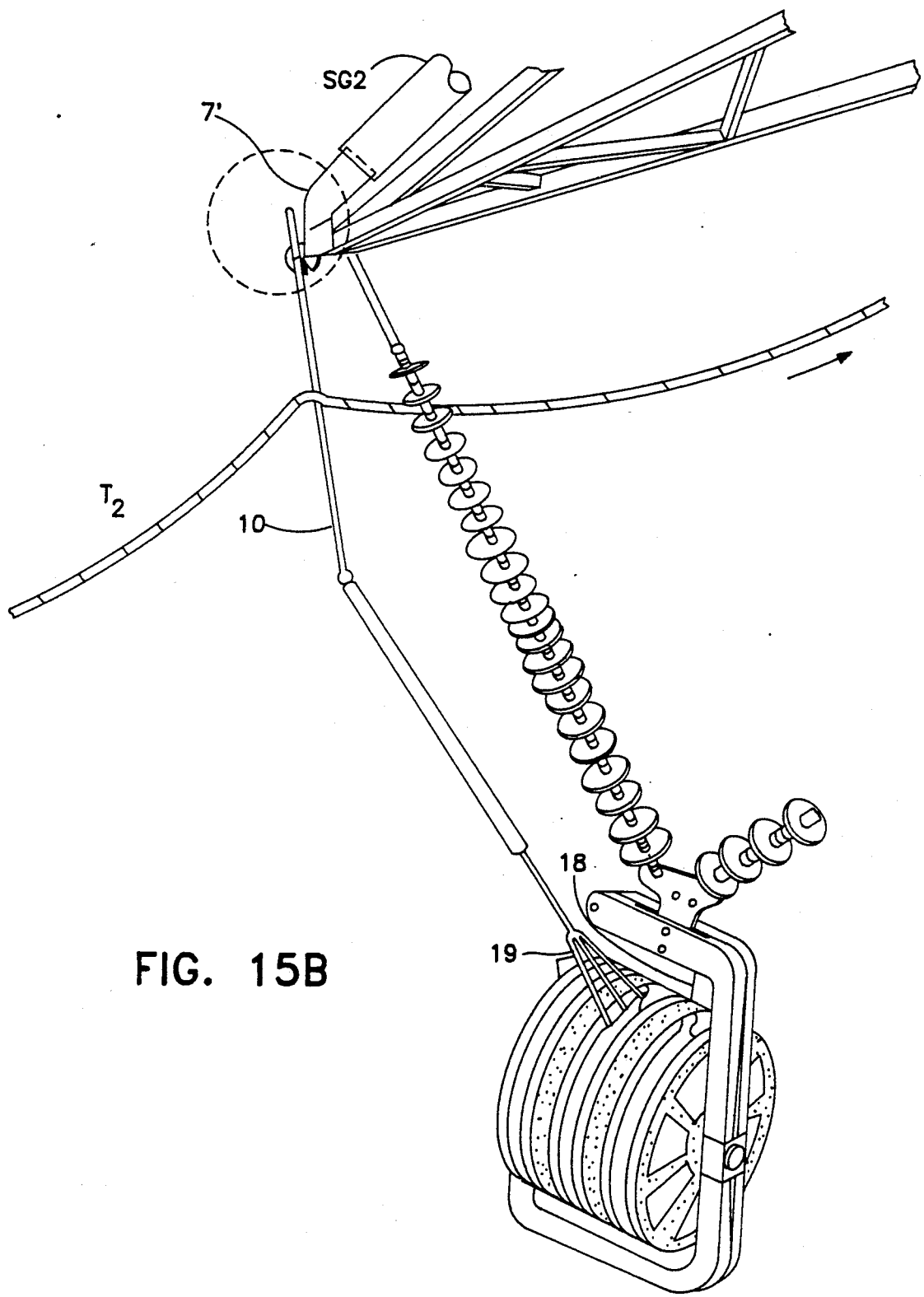
Figure 15C:
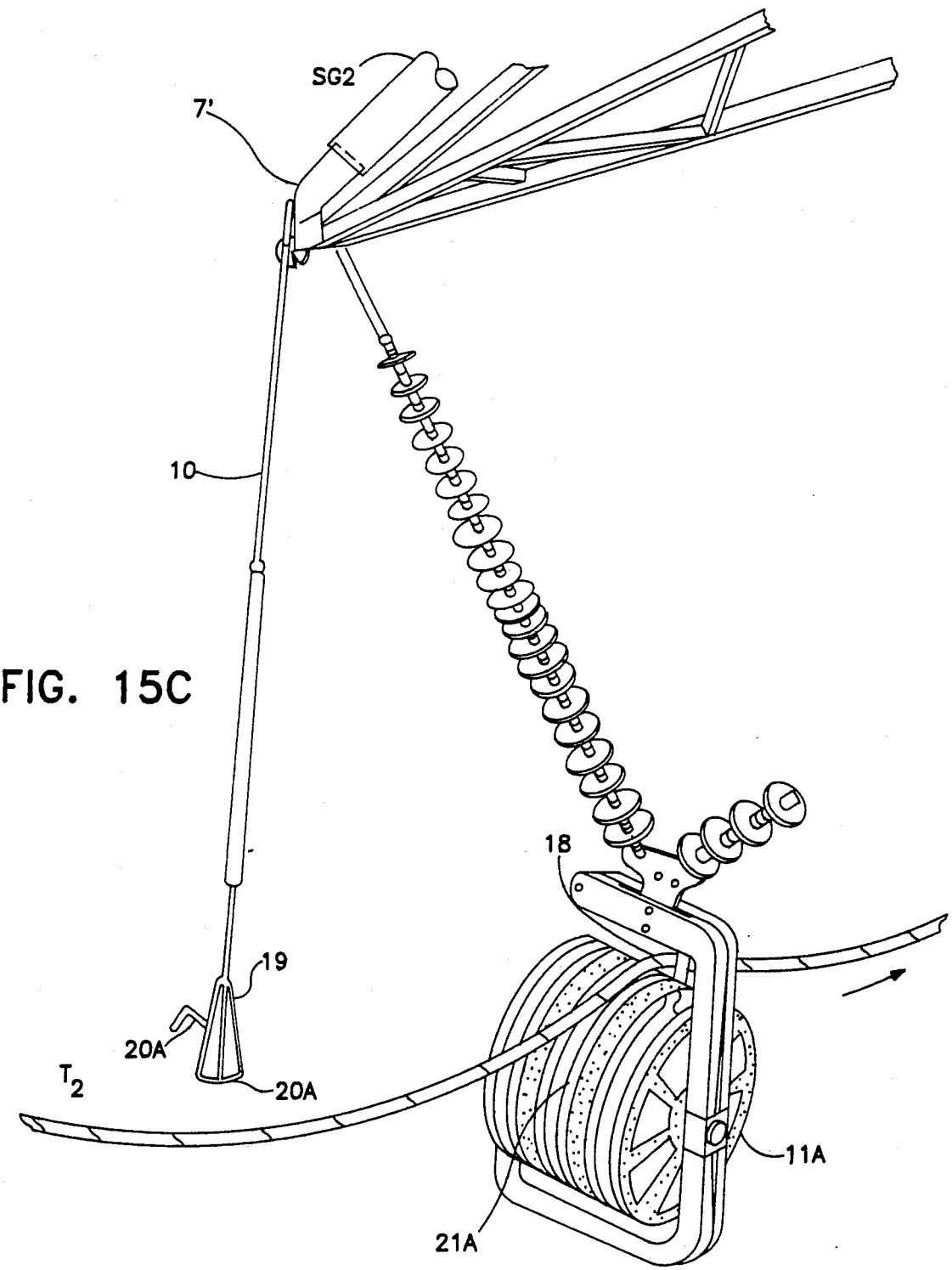

As the spreader-device (3) (not shown) moves away from tower (1), cable (T2) (FIG. 15A) first reaches end (7') of guide (SG2) and then falls into the eccentric space (25) of reeving-wheel (22) (FIG. 16A). Once cable (T2) has fallen into space (25), its own weight causes reeving-wheel (22) to start rotating and take up the position shown in FIG. 16B. Cable (T2) will therefore fall down toward pulley unit (11a) (FIG. 15B). As cable (T2) reaches the groove of pulley wheel (21a) (FIG. 15C) said pulley wheel will also start rotating and the special end (20a) of rod (10) will disconnect from said pulley unit (11a).

As mentioned, section 16C shows the details of the mechanism that allows wheel (22) to be securely attached to rod (10) and to end (7') of guide (SG2), while at the same time be able to freely rotate around pin (24) and let cable (T2) pass through. Special double-guides (26b) and (26) are associated with end (7') of guide (SG2) and the enlarged rim (23) of reeving-wheel (22), while at the same time reeving-wheel (22) is also secured to rod (10) through pin (24). In this way rim (23) and special double-guides (26b) and (26) hold wheel (22) securely in place while pin (24) and rod (10) let it rotate freely. Said special double-guides (26b) and (26), reeving-wheel (22) and its enlarged rim (23) are preferably made with "self-lubricating" and "corrosion-resistant" materials.

As shown in FIG. 15A, pulley unit (11a) has an "open" or "C" shaped frame. These specialized pulley units could have any number of wheels in order to accommodate any number of conductors. The pulley unit which we have illustrated would typically be used for bundles of two or three conductors. Stop-bar (18) (FIG. 15A) has the specific purpose of not letting cable (T2) fall in any other wheel groove but (21a) and is made so that when a "spreader-deviator" device ((SD1) FIG. 5) reaches said pulley, while pulling two or three conductors and a supplementary draw cable ((T3) FIG. 5), said stop-bar (18) will allow said "spreader-deviator" device (SD1) to freely pass on the grooves of the pulley unit.

Figure 4:
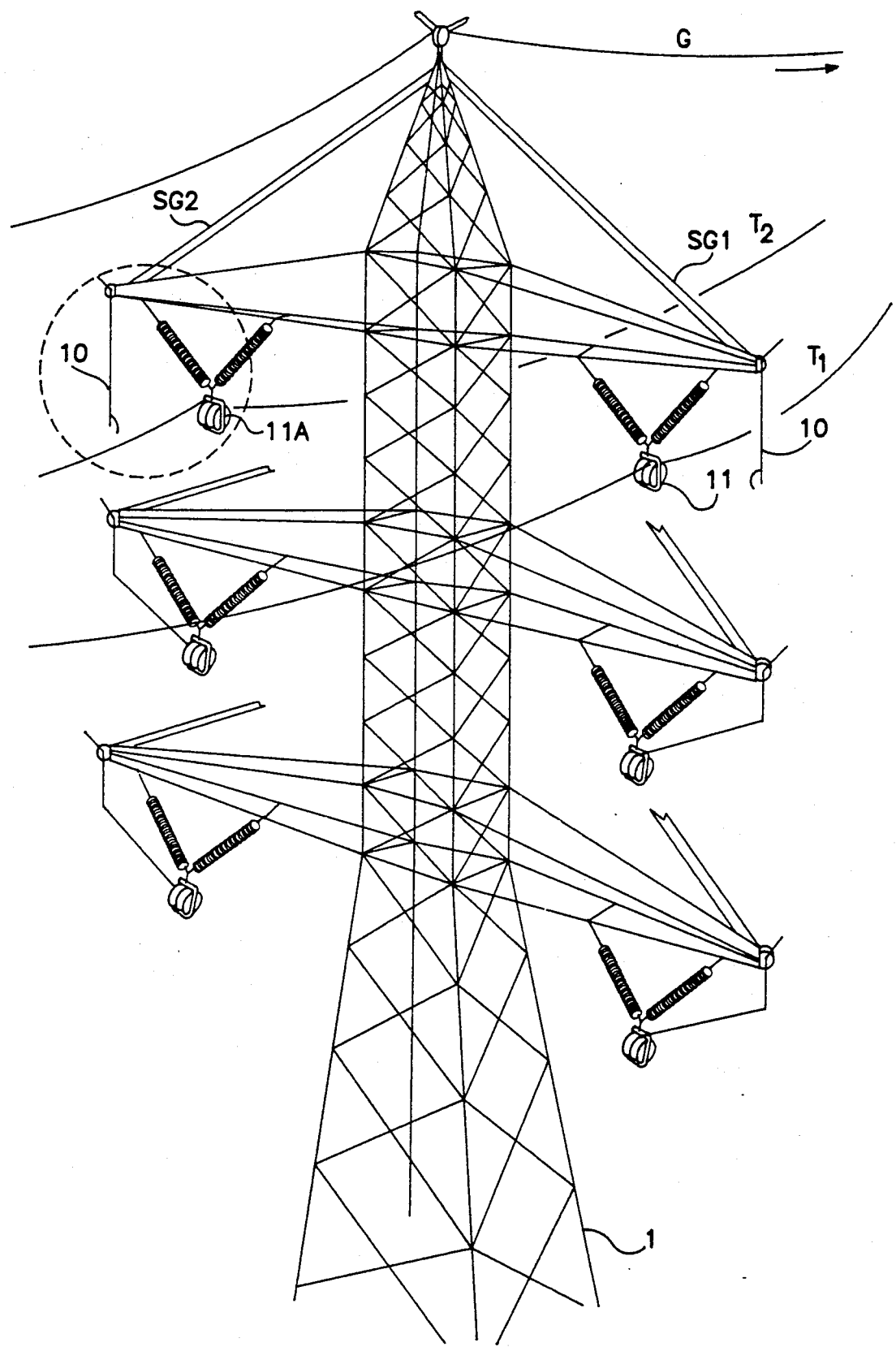

FIG. 4 shows draw cables (T1) and (T2) properly positioned in the central wheel of pulley units (11) and (11a), and broom-guides (10) disconnected from said pulley units.

Figure 5:
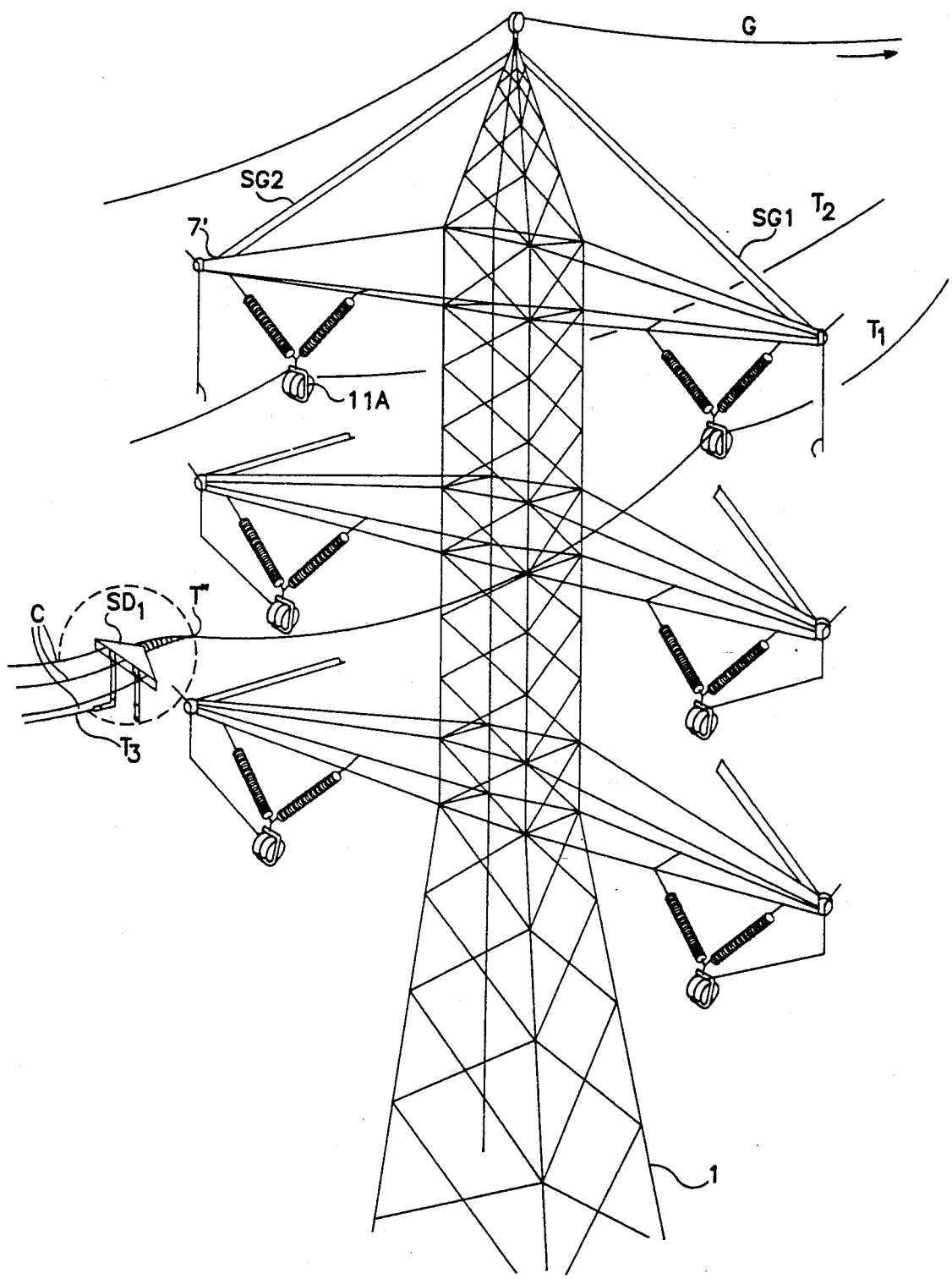

As briefly mentioned, FIG. 5 shows the next operational stage. Here end (T") of cable (T1) is coupled to a "spreader-deviator" device (SD1), while device (SD1), in its turn, is connected to a bundle of conductors (C) and a supplementary draw cable (T3) needed for the phase below.

Figure 14D:
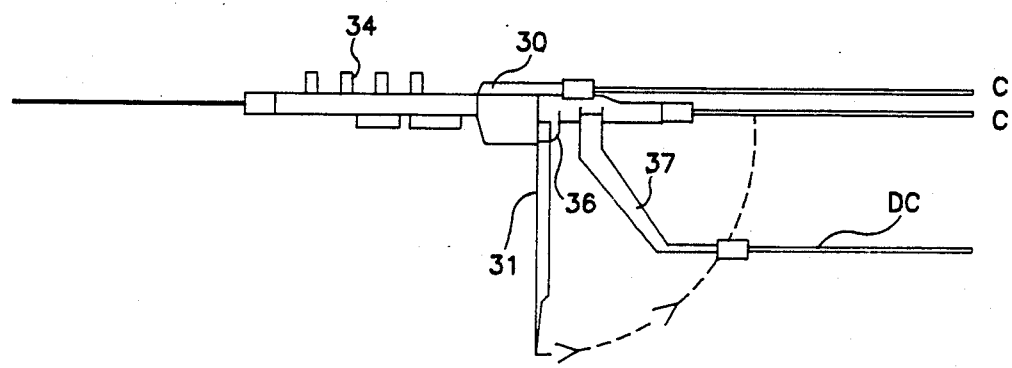
Figure 14E:
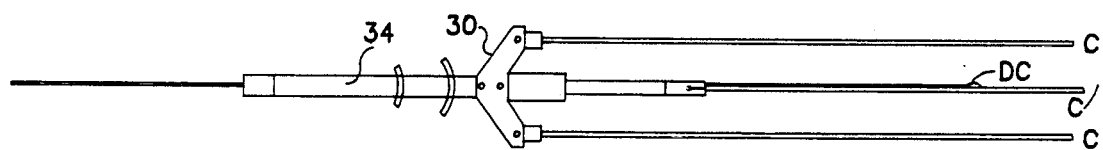
Figure 14F:
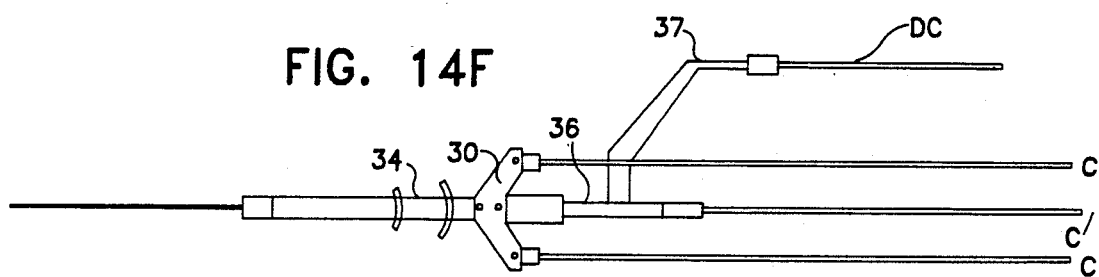

The "spreader-deviator" device differs from "spreader" ((3) FIG. 1) for the details shown in FIGS. 14D to 14F. As mentioned earlier, the "spreader-deviator" is normally used to simultaneously pull a bundle of conductors (C) together with a supplementary draw cable (DC). It basically has the same structure as the "spreader" illustrated in FIG. 14A, but is also fitted with a "deviating-arm" (37) attached below plate (30) and activated by cams (36) (not shown in detail). When the "spreader-deviator" device passes over a pulley and/or pulley unit (not shown), counter-weight (31) and cams (36) induce a 90 degree rotation to "deviating-arm" (37) (FIG. 14F). At this point, while bundle of conductors (C) are positioned in the grooves of the pulley and/or pulley unit, draw cable (DC) is translated from its primitive position below conductors (C) (FIG. 14D and 14E), to a new and temporary position to the right (FIG. 14F), or to the left (not shown), of conductors (C), outside the grooves and frame of the pulley or pulley unit (not shown). Cable (DC) will therefore fall and undertake the position illustrated in FIG. 6.

Figure 6:
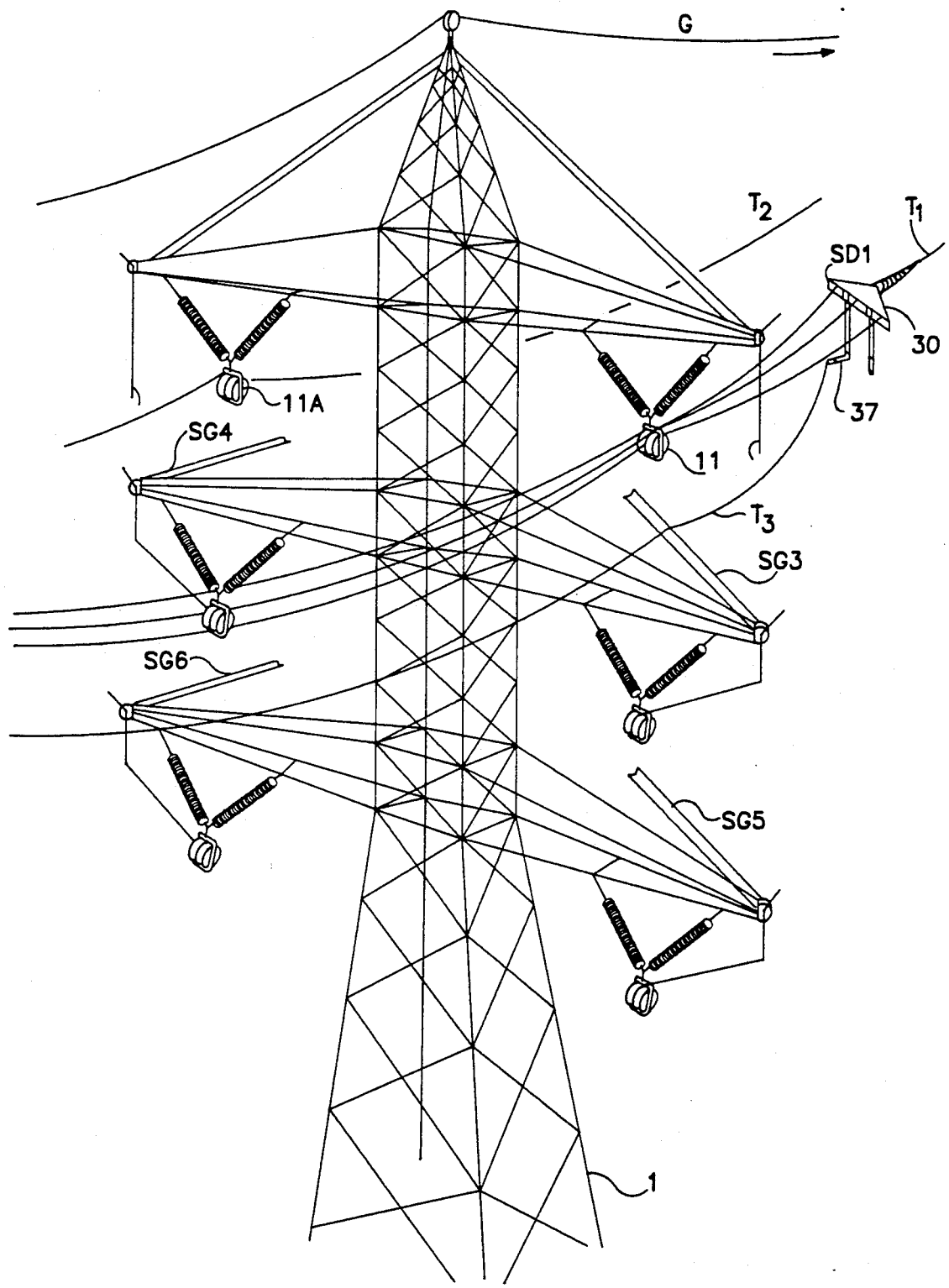
Figure 7:
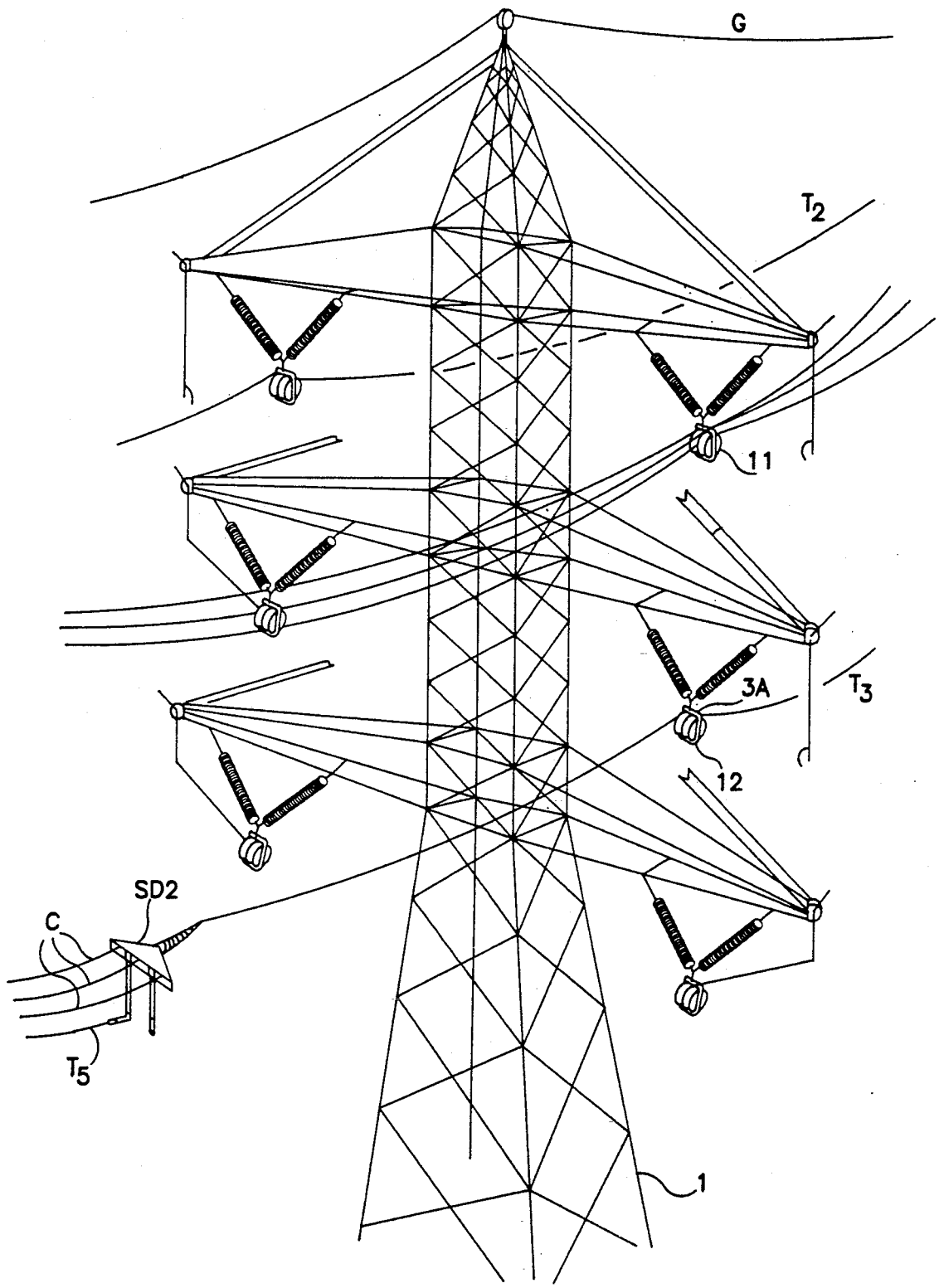

FIG. 6 shows that once the "spreader deviator" (SD1) has passed over pulley (11), the bundle of conductors (C) is positioned in the grooves of pulley unit (11), while the supplementary draw cable (T3) has fallen onto slide guide (SG3). This figure also shows that once the "spreader-deviator" has passed over the pulley, deviating-arm (37) has returned to its primitive position perpendicularly below plate (30). The final position of cable (T3), in the central groove of the pulley connected to slide-guide (SG3) is illustrated in FIG. 7. As an alternative slide guides (SG3) to (SG6) could be longer and secured to either the base of the pulleys above them or to the body of tower (1). Obviously, slide guides (SG3) to (SG6) will also have round cross sections and be fitted with bearings to facilitate the downward motion of the cables.

FIG. 7 also shows another "spreader-deviator" device (SD2) approaching pulley unit (12). This will take place only after the first "spreader-deviator" ((SD1) FIGS. 5 and 6) has reached the winch (not shown), and bundle of conductors (C) and cable (T3) have been completely strung and positioned on each tower. This limitation does not lay within the mechanics of the present invention but in the following facts: 1) all existing brakes or tensioners do not have more than four drums, and consequently can string only four cables and/or conductors at once; 2) existing winches or pullers have a maximum load capacity which averages 18,000 Kg. (or approximately 39,600 pounds). Consequently, depending on the size of the cables and/or conductors, said maximum load capacity also limits the number of cables and/or conductors that can be strung at once. Thanks to the present invention on the other hand, if we were stringing a power line that had only one conductor per phase rather than three we would not have to wait for device (SD1) to reach the winch before connecting device (SD2) to cable (T3), and consequently we would not even need a full length (from brake to winch) of cable (T3), but only a length approximately 100 m. longer than the average span between two towers.

The operational stages described hereinbefore with reference to FIGS. 5 to 7, which show the positioning and pulling of draw cables and bundles of conductors for the upper two phases on the right side of the tower, will be repeated for completing the stringing on all six phases of the tower or series of towers between the brake and the winch.

FIGS. 8 to 13 show the sequence of operations according to the invention for stringing on flat-circuit (or "Delta") towers.

Figure 8:
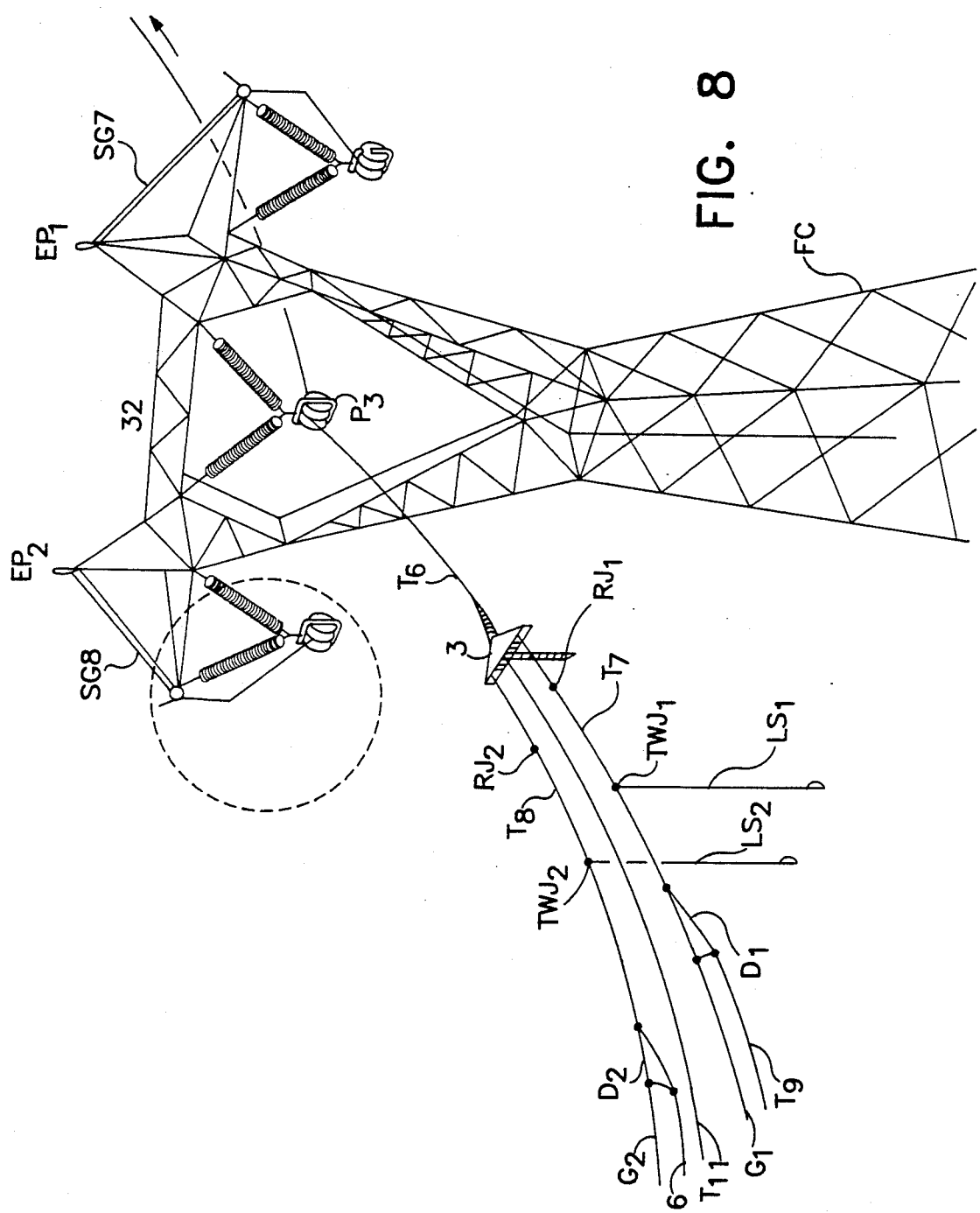
FIGS. 8 to 13 show a single-circuit "DELTA" tower also fitted with special equipment during six subsequent stringing stages.
Figure 12:
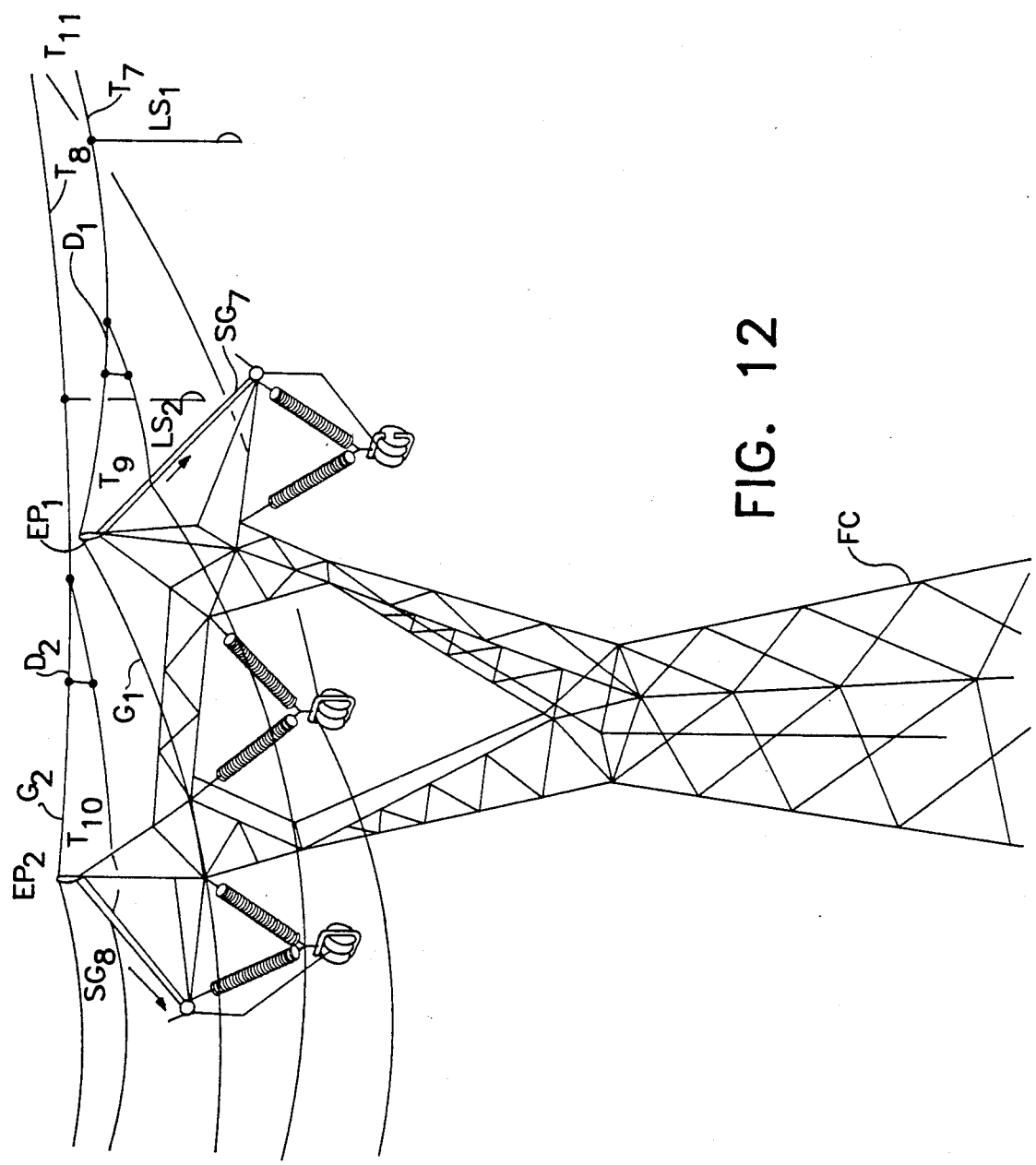

FIG. 8 shows that the first draw cable (T6) is now positioned directly in the central groove of pulley (P3) rather than on the special pulley (2) mounted on the additional peak (35) of the tower illustrated in FIG. 12 of U.S. Pat. No. 4,596,379. Draw cable (T6) is now connected to a spreader (3) which in its turn is connected to draw cables (T7), (T8), and (T11). In addition, cables (T7) and (T8) have been fitted with three new devices. More specifically, cables (T7) and (T8) are connected to: 1) a rapid-joint (RJ1) (or (RJ2)) at about 40 to 50 meters from device (3); 2) a special three-way-joint (TWJ1) (or (TWJ2)) at about 10 meters from devices (RJ1) (or (RJ2)), and 3) a "deviator" (D1) (or (D2)) at about 10 meters from device (TWJ1) (or (TWJ2)). A length of service cord (LS1) (or (LS2)) is hanging from each three-way-joint (TWJ1) (or (TWJ2)), while at the same time each deviator (D1) (or (D2)) is connected to one shield-wire (G1) (or (G2)), and one additional draw cable (T9) (or (T10)).

FIG. 17 shows that the special three-way-joint ((TWJ1) or (TWJ2) FIG. 8) is made by three parts (J1), (J), and (J2). Each one of these three parts is fitted with space (46). Each space (46) is crossed by pin (51), and each pin (51) is fitted with roller (49). Each space (46) and roller (49) allow the looped-end of a draw cable or service cord (not shown) to be attached to the special three-way-joint. Pin (54) connects parts (J1) and (J2) to part (J), while bearings (48) allow parts (J1) and (J2) to freely rotate about pin (54). By allowing parts (J1) and (J2) to freely rotate about pin (54), absorbing the twists and torques of the cables there connected, part (J) will never rotate or twist leaving the cable connected therefrom ((LS1) or (LS2) FIG. 8) always perfectly perpendicular to the pulling axis for the purpose described hereinafter.

Figure 9:
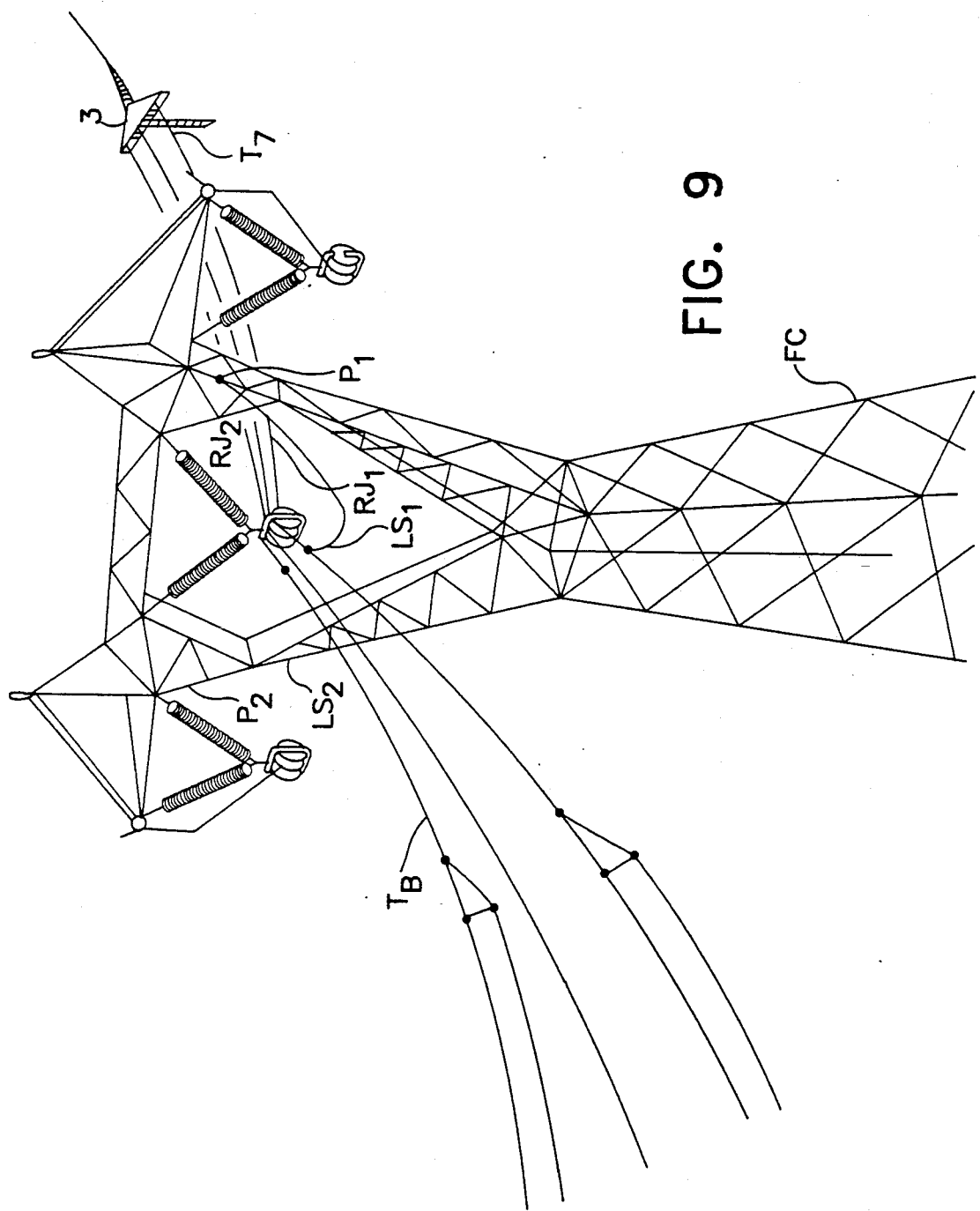

FIG. 9 shows that once the lengths of service cables (LS1) and (LS2) have reached the tower, the operator at the winch (not shown) stops pulling the cables. After the pull has been stopped, two line-men (not shown) take the loose ends of the lengths of service cables (LS1) and (LS2), and attach them securely to points (P1) and (P2) of tower (FC). Once (LS1) and (LS2) have been attached to the tower, the operator at the winch (not shown) will decrease the tension on the draw cables.

Figure 10:
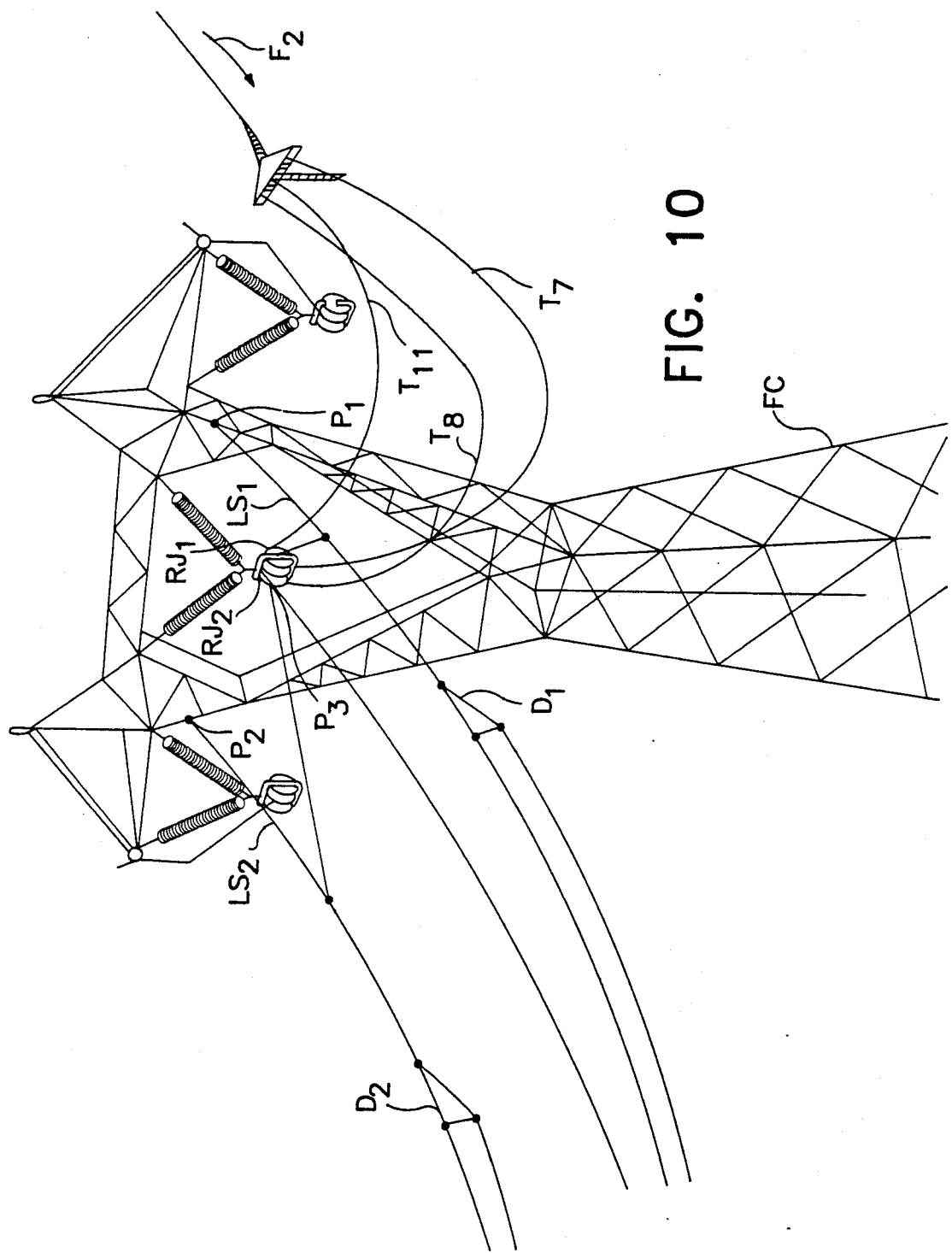

FIG. 10 shows that while the tension is being decreased, spreader (3) backs up or moves in the direction of arrow (F2), lengths of service cable (LS1) and (LS2) go under tension, draw cables (T7) and (T8) become slack, and rapid-joints (RJ1) and (RJ2) end up in the two lateral grooves of pulley (P3).

Figure 11:
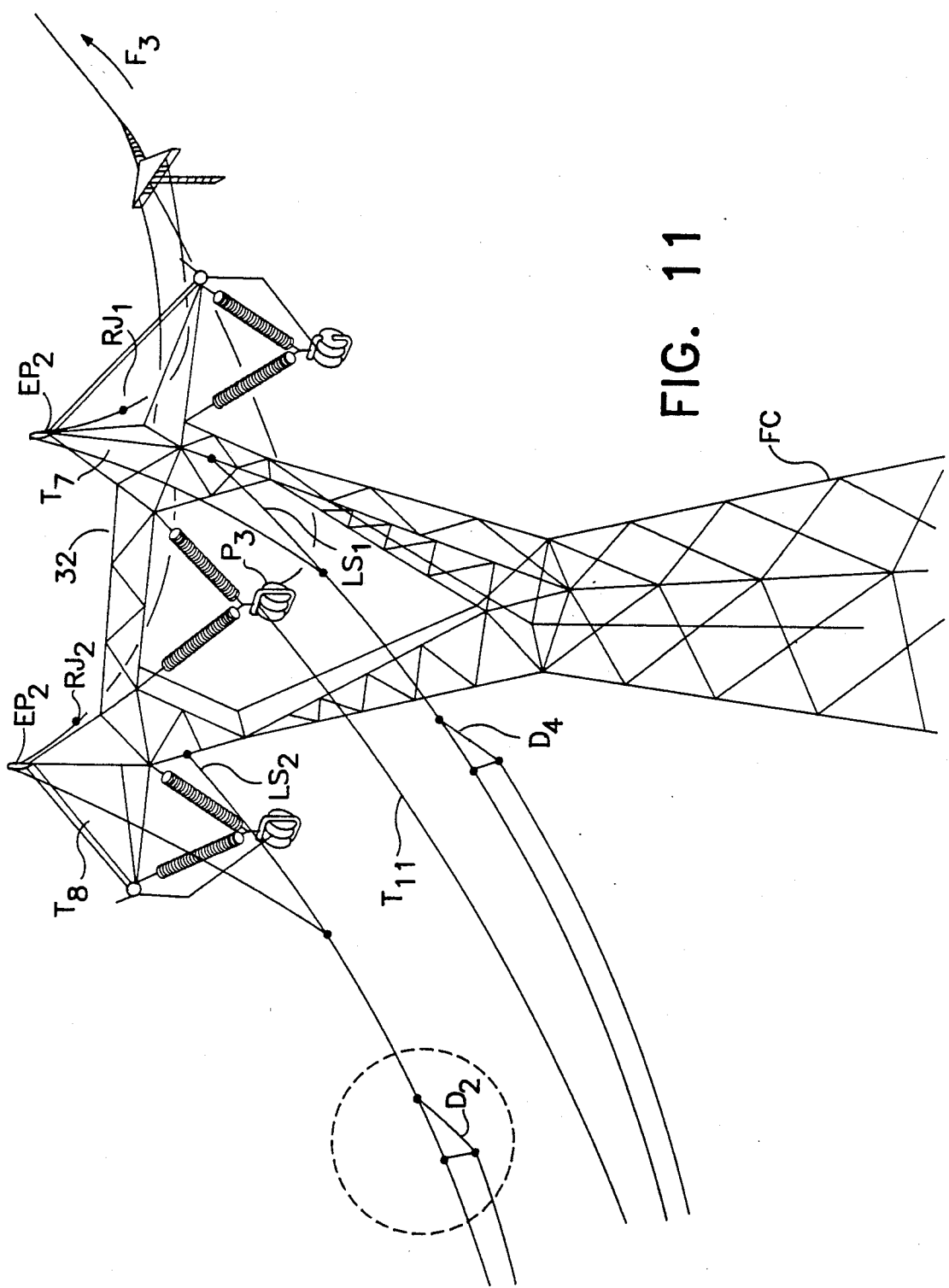

The next operation has been illustrated in FIG. 11. Once the lengths of service cable (LS1) and (LS2) are under tension and rapid joints (RJ1) and (RJ2) are in the grooves of pulley unit (P3), the two line-men (not shown) will act on rapid-joints (RJ1) and (RJ2) to easily disconnect the slack cables (T7) and (T8), pass them over beam (32), and position them in the grooves of pulleys (EP1) and (EP2).

After this operation has been completed, the operator at the winch (not shown) will start pulling the cables again (arrow (F3)). Once cables (T7) and (T8) have reached the previous tension, service cables (LS1) and (LS2) will be detached from points (P1) and (P2) of tower (FC).

FIG. 11 also calls our attention on the special "deviator" device (D2) (or (D1)) which details are illustrated in FIGS. 18A and 18B.

FIG. 12 shows that deviators (D1) and (D2) have passed over pulleys (EP1) and (EP2), shield-wires (G1) and (G2) are in the grooves of said pulleys, and cables (T9) and (T10) have started sliding on slide-guides (SG7) and (SG8).

Figure 13:
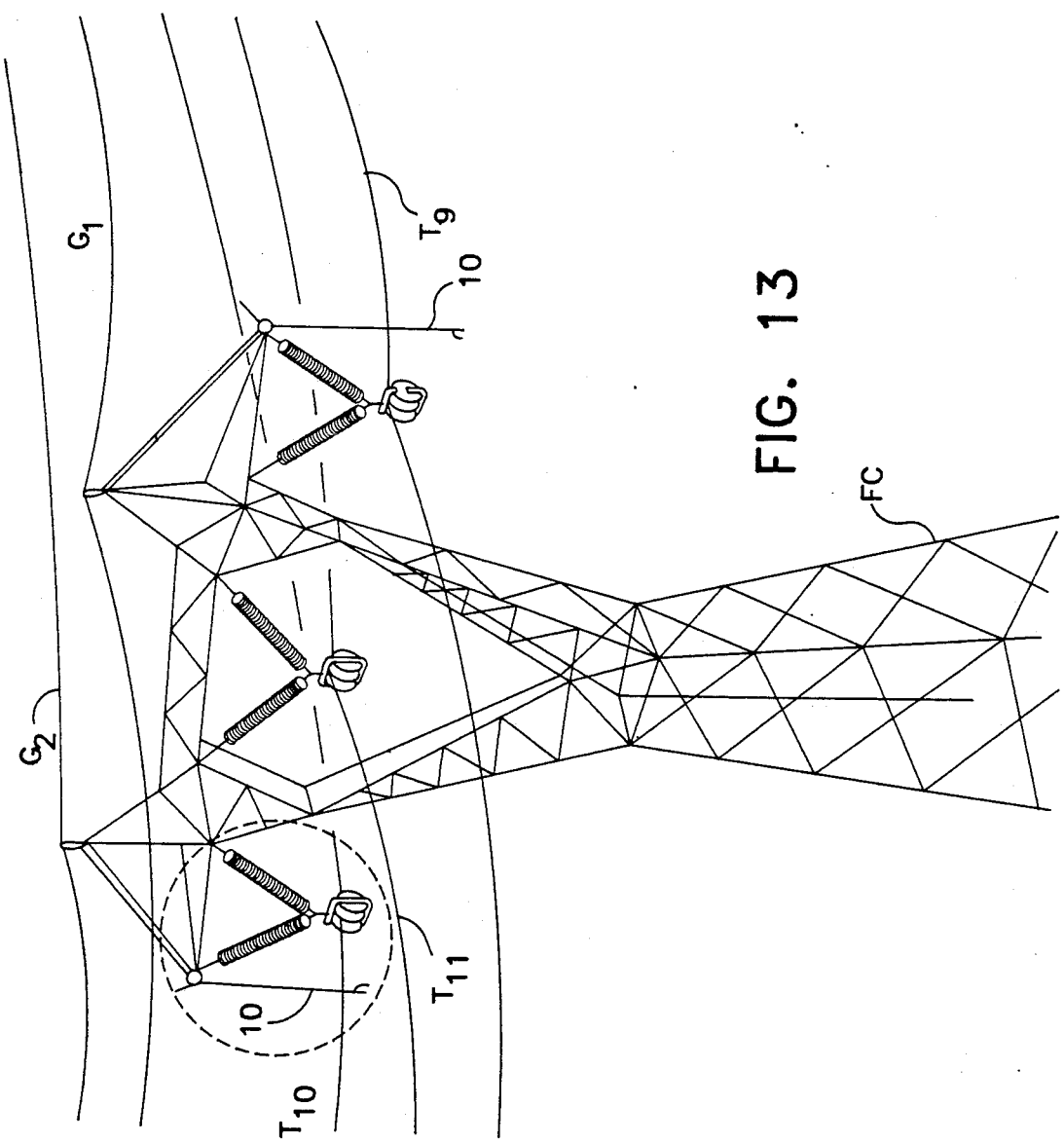

Finally, FIG. 13 illustrates the completion of the positioning of shield-wires (G1) and (G2), already in their final position, and draw cables (T9), (T10), and (T11) in the central groove of their respective pulley units suspended from the insulators. Each draw cable will now be used to pull either single or bundles of conductors. It is to be understood that both slide guides (SG7) and/or (SG8) and guides (10) are similar to the ones described earlier on for the double circuit tower and should therefore be referred to the same figures for details. Moreover, the short manual intervention illustrated for flat-circuit towers in FIGS. 9 to 11 can be used for stringing on any type of towers particularly if the stringing conditions, the state of the terrain, and consequently the position of the brake (or tensioner) and the winch (or puller) require to pull the cables and/or conductors through angles greater than 10 degrees.

In addition to the previously mentioned main advantages of rapid performance, particularly on difficult or irregular routes, and protection of the vegetation at all times, the present invention also allows a considerable reduction of the quantities of pilot and/or service cords and/or draw wires required as compared to the traditional manual and/or helicopter stringing methods.

I claim:

1. An apparatus for stringing high tension power lines on a set of towers, comprising:
    first pulley means (2) mounted generally on the top of each tower (1) for receiving a first cable (T) and a spreader member (3) carrying at least second and third cables (T1, T2);
    rolling guide means (SG1 to SG6) mounted above each crossarm of each tower, guiding cables along the rolling surface of said rolling guide means, generally downwardly from said first pulley means;
    a second set of pulley means (11, 11a) suspended from the insulators of each crossarm for receiving at least one of said second and third cables (T1, T2);
    second guide means (10, 19, 22 to 26) for connecting each of said rolling guide means (7, SG1 to SG6) to each of said second set of pulley means (11, 11a) for guiding cables from said rolling guides into the central sheave of said second set of pulleys;
    wherein said second guide means include reeving wheel means (22 to 26) and "broom"-means (10, 19) consisting of an articulated rod (10) whose upper end is connected to the tip (7') of the crossarm and to the lower end of one of said rolling guide means by means of an interface consisting of said reeving wheel means (22 to 26), whereas a lower end (19) of said articulated rod (10) is hooked to the central sheave (21a) of one of said second set of pulleys beneath said one crossarm;
    wherein said interface includes a rotating reeving wheel (22), said wheel having means (25) for allowing the cables (T2) that slide along the rolling surface of said rolling guide means to pass through the interface and slide between the insulators and the sliding surface of said second guide means.

2. An apparatus as set forth in claim 1 wherein the lower end of said articulated rod is arched with the same radius of said central sheave of said second set of pulleys.

3. An apparatus as in claim 1), further comprising means for automatically releasing the lower end (19) of said articulated rod (10) hooked to said central sheave (21a) of said second set of pulleys, when said central sheave (21a) starts rotating.

4. An apparatus as in claim 3), wherein said articulated rod (10) stabilizes the longitudinal transversal and rotary movements of said second set of pulleys when each of said second set of pulleys is suspended from one string of insulators only.

5. An apparatus as in claim 1), wherein the upper end of said articulated rod (10) carries a pin (24) about which said reeving wheel freely rotates.

6. An apparatus as set forth in claim 1 wherein said reeving wheel is connected to said rolling guide means and the tip of crossarms by means of enlarged outer rims fitted within said reeving wheel and arched sliding guides fitted within the lower end of said rolling guide means.

7. An apparatus as in claim 1), wherein said reeving wheel (22) has a slit (25) so that, when a cable (T1, T2) falls in said slit (25), the weight of said cable generates an eccentric force about the pin (24) fitted within said articulated rod (10), causing said reeving wheel (22) to rotate and said cable to pass from the rolling surface of said rolling guide means to the sliding surface of said second guide means.

8. An apparatus as set forth in claim 7 wherein said slit is longitudinally shorter that the radius of said reeving wheel and transversely shorter than the length of said arched sliding guides fitted within the lower end of said rolling guie means.

9. An apparatus for stringing high tension power lines on a set of towers, comprising:
    first pulley means (2) mounted generally on the top of each tower (1) for receiving a first cable (T) and a spreader member (3) carrying at least second and third cables (T1, T2);
    rolling guide means (SG1 to SG6) mounted above each crossarm of each tower, guiding cables along the rolling surface of said rolling guide means, generally downwardly from said first pulley means;
    a second set of pulley means (11, 11a) suspended from the insulators of each crossarm for receiving at least one of said second and third cables (T1, T2);
    second guide means (10, 19, 22 to 26) for connecting each of said rolling guide means (7, SG1 to SG6) to each of said second set of pulley means (11, 11a) for guiding cables from said rolling guides into the central sheave of said second set of pulleys;
    a spreader member connecting the first cable (T) to other cables;
    a spreader-deviator member connecting at least one of said other cables to a second set of other cables, one cable of said second set of other cables being attached to a deviating arm below the other cables of said second set of other cables;
    a deviator member connecting one cable to at least two supplementary cables where one of said at least two supplementary cables is attached to an apex of said deviator member below the other cable of said at least two supplementary cables.

10. An apparatus as set forth in claim 9 wherein said spreader member comprises a tridimensional plate having ball-joints means for connecting more than one cable and support tractive and resisting forces.

11. An apparatus as set forth in claim 10 wherein said tridimensional plate is fitted with longitudinal splines to reduce contact and friction points to the races of a pulley unit when said tridimensional plate passes over said pulley unit.

12. An apparatus as set forth in claim 10 wherein the position on the vertical plane of said tridimensional plate is determined by the position of said ball-joints in the points at which the resisting forces act and the fact that said contact points are limited to the races of said pulley unit only.

13. An apparatus as set forth in claim 10 wherein said ball-joints are connected to said tridimensional plate so that the vertical coordinates of the points at which the resisting forces act are lower than the vertical coordinates of the points at which the tractive forces act.

14. An apparatus as set forth in claim 13 wherein said points at which the resisting and tractive forces act are ball-joints having a maximum rotation angle at least equal to one half the angle imposed on the cables connected to said ball-joints when said tridimensional plate passes over a pulley unit suspended from an angle and summit tower.

15. An apparatus as set forth in claim 10 wherein the horizontal coordinates of said ball-joints are conditions of said tridimensional plate.

16. An apparatus as set forth in claim 9 wherein said spreader-deviator member includes a tridimensional plate and a deviating arm attached below said tridimensional plate.

17. An apparatus as set forth in claim 16 wherein the upper end of said deviating arm is connected to said tridimensional plate by means of cams.

18. An apparatus as set forth in claim 16 wherein said tridimensional plate is connected to at least one cable and the lower end of said deviating arm is connected to at least one supplementary cable.

19. An apparatus as set forth in claim 18 wherein said at least one supplementary cable is connected to said deviating arm below said at least one cable.

20. An apparatus as set forth in claim 16 wherein said deviating arm automatically rotates about a pin so that its lower end and said at least one supplementary cable attached therefrom move to an outer position parallel to said tridimensional plate when said spreader-deviator member passes over a pulley.

21. An apparatus as set forth in claim 20 wherein the rotation of said deviating arm causes said at least one supplementary cable attached therefrom to fall onto rolling guides securely connected to the crossarm beneath said pulley.

22. An apparatus as set forth in claim 9 wherein said deviator member includes a tension rod that transfers the tractive force onto the supplementary cable attached below the other cable and a push rod that maintains said supplementary cable attached below the other cable at a prescribed distance from said other cable.

23. An apparatus as set forth in claim 22 wherein said tension rod is connected at both ends to said other cable by means of clamps, said other cable maintaining its continuity.

24. An apparatus as set forth in claim 22 wherein the profile and the dimensions of said tension rod and said push rod change the tractive forces when said deviator member passes over a pulley unit.

25. An apparatus as set forth in claim 22 wherein said deviator member partially assists the tractive force acting on said other cable to aid the lifting of said supplementary cable attached below said other cable when said deviator member passes over a pulley.

26. An apparatus as set forth in claim 25 wherein said tractive forces are assisted in conjunction with the balance of all other forces acting on said tension rod to lift said supplementary cable attached below said other cable when said deviator member passes over a pulley.

27. An apparatus as set forth in claim 22 wherein the vertices of the triangle defined by said tension rod, push rod, and the upper cable of said at least two supplementary cables are hinges so that said triangle is not stressed by bending moments or moments at fixed end.

28. An apparatus as set forth in claim 22 wherein the longitudinal forces that said supplementary cable attached below the other cable transfers on said other cable are offset by forces of said deviator member.

* * * * *